United States Patent [19]
Tozuka et al.

[11] Patent Number: 6,139,967
[45] Date of Patent: Oct. 31, 2000

[54] CLINGING SHEET

[75] Inventors: Tosiaki Tozuka; Tomisi Shibano, both of Saitama, Japan

[73] Assignee: Lintec Corporation, Tokyo, Japan

[21] Appl. No.: 09/153,035

[22] Filed: Sep. 15, 1998

[30] Foreign Application Priority Data

Sep. 16, 1997 [JP] Japan .................................. 9-268243

[51] Int. Cl.[7] .............................. B32B 27/40; C09J 7/02
[52] U.S. Cl. .................................. 428/423.1; 428/355 N; 428/423.7; 428/424.2; 428/424.4; 428/425.8
[58] Field of Search ........................... 428/355 N, 423.1, 428/425.5, 423.7, 424.2, 424.4, 424.8, 425.1, 425.8

[56] References Cited

U.S. PATENT DOCUMENTS

| | | | |
|---|---|---|---|
| 5,415,935 | 5/1995 | Pankratz | 428/352 |
| 5,512,650 | 4/1996 | Leir et al. | 528/14 |

FOREIGN PATENT DOCUMENTS 0 380 236  8/1990  European Pat. Off. .

OTHER PUBLICATIONS

Chemical Abstracts, vol. 116, No. 14, Apr. 6, 1992, Columbus, Ohio, U.S.; Abstract No. 103742t (JP 03 170579 A, Jul. 24, 1991).

Patent Abstracts of Japan, vol. 012, No. 297 (C–519), Aug. 12, 1988 (JP 63 063776A, Mar. 22, 1988).

*Primary Examiner*—D. S. Nakarani
*Attorney, Agent, or Firm*—Sughrue, Mion, Zinn, Macpeak & Seas, PLLC

[57] ABSTRACT

The present invention provides a clinging sheet which comprises a base film and a clinging layer formed on one or both surfaces of the base film, said clinging layer comprising a siloxane-modified polyurethane resin containing 2 to 50 percent by weight of a polysiloxane component. The clinging sheet can be clung to an adherend having a smooth surface, easily peeled therefrom without damaging the clinging sheet or staining the adherend, and clung repeatedly to the same adherend or other adherends.

3 Claims, No Drawings

CLINGING SHEET

BACKGROUND OF THE INVENTION

1. Field of the Invention

The present invention relates to a clinging sheet. The clinging sheet can be clung to an adherend having a smooth surface, such as a glass, a plastics, a metal and a coating surface, easily peeled therefrom without damaging the clinging sheet and the adherend or staining them, and clung repeatedly to the same adherend or other adherends. The clinging sheet can be used for a label, a sticker, a seal and the like.

2. Description of Related Art

A pressure sensitive adhesive is generally used as an adhesive for a label, a sticker, a seal and the like. But, the pressure sensitive adhesive layer formed in the label et. al. has large tackiness of the adhesive. Therefore, when there is an error in adhering the label et. al. on the adherend, the label et. al. can not be easily peeled and adhered again in a suitable position on the adherend. And when the label et. al. is peeled after long time adhesion, the adherend is damaged, the label et. al. is torn, or it needs a lot of work to remove the pressure sensitive adhesive remained on the adherend. Further, a part of the adhesive permeates into the adherend, so that stain and/or discoloration are generated. Once rubbish and/or dust adhere to the pressure sensitive adhesive layer, the pressure sensitive adhesive strength is easily decreased sharply, the rubbish and/or dust can not be easily removed by washing, and it is difficult to restore the pressure sensitive adhesive strength. It is desired that the rubbish and/or dust can be removed from the adhesive layer of the label et. al. by simple washing and the label et. al. can be adhered again to the adherend.

In order to resolve these problems of the label, the sticker and the seal having the pressure sensitive adhesive layer, the label et. al. having the adhesive layer, which does not comprise the pressure sensitive adhesive, is proposed. For example, the clinging sheet of Japanese Utility model Application Kokoku 6-21711 has a clinging layer consisting of a silicone rubber formed on a polyester film and the clinging sheet of Japanese Patent Application Kokai 8-1870 has a clinging layer consisting of a polyurethane elastomer formed on a base film. However, the clinging sheets can resolve some problems of the label et. al. having the pressure sensitive adhesive layer, but is not sufficiently satisfied with the solution of the problems in any use conditions.

When the clinging sheet of Japanese Utility model Application Kokoku 6-21711 having a clinging layer consisting of a silicone rubber is adhered on the glass, a reaction between the silicone rubber and a glass plate is caused with water in air after long time adhesion on the glass plate, and the both members were adhered strongly, so that the clinging sheet is not easily peeled. In peeling the clinging sheet against the adhesive strength, the silicone rubber is remained on the glass plate in many cases and the removal of the silicone rubber is much difficult. Further, the silicone rubber adsorbs rubbish and/or dust easily because of easy generation of static electricity and the rubber properties, the surface of the clinging layer is stained and the adhesive strength is easily decreased. And, the rubbish and/or dust adsorbed on the clinging layer is difficult to remove by washing, but easy in compared with the pressure sensitive adhesive layer. Furthermore, a low molecular weight silicone component contained in the silicone rubber permeates easily into the adherend, the adherend is stained in almost cases, and a surface energy of the adherend is decreased.

In the clinging sheet of Japanese Patent Application Kokai 8-1870 having a clinging layer consisting of a polyurethane elastomer, the stain of the adherend as described above in the silicone rubber is not generated, adsorption amount of the rubbish and/or dust is little, and the clinging property is easily recovered by washing. But, in the case of the specific kinds of plastic adherends, the clinging sheet is adhered strongly after long time adhesion and can not be easily peeled from the adherend. In particular, the problems generate in the adherend having comparative high surface energy, such as the adherends consisting of a polycarbonate resin, an acrylic resin, a vinyl chloride resin and the like. When the adherend is made of glass, the problems are not generated.

SUMMARY OF THE INVENTION

The present invention is provided to resolve the problems of the clinging sheet having the clinging layer consisting of the silicone rubber or polyurethane elastomer described above.

One object of the present invention is to provide the clinging sheet which can be clung to an adherend having a smooth surface, such as a glass, a plastics, a metal and a coating surface, easily peeled therefrom without damaging the clinging sheet or staining the adherend, and clung repeatedly to the same adherend or other adherends.

Thus, the present invention is directed to a clinging sheet which comprises a base film and a clinging layer formed on one or both surfaces of the base film, said clinging layer comprising a siloxane-modified polyurethane resin containing 2 to 50 percent by weight of a polysiloxane component.

DESCRIPTION OF PREFERRED EMBODIMENTS

The base film in the clinging sheet of the present invention includes various films made of various materials, such as a thermoplastic resin film, a symthetic paper, a metal foil, a paper and a laminated film thereof. The film may be or not stretched.

The thermoplastic resin includes various thermoplastic resins. The suitable examples of the thermoplastic resins are, for example, a polyethylene resin, a polypropylene resin, an ethylene-propylene random copolymer resin, a polyester resin, a polystyrene resin, an ethylene-vinyl acetate copolymer resin, and an ethylene-acrylic copolymer resin. The thermoplastic resin may be used singly or in combination of two or more members. Also, the thermoplastic resin may be mixed with one or more of various rubbers, such as an ethylene-propylene copolymer rubber and a ethylene-propylene-diene copolymer rubber. The suitable examples of the base film are, for example, a polyester film such as a polyethylene terephthalate film, an oriented polypropylene film, a crystallized polypropylene film and a polyethylene film.

The surface of the base film, on which the clinging layer is formed, is preferably smooth. The surface of the base film can be coated with a resin coat layer, or can be treated by corona discharge treatment or electrolytic dissociation radiation treatment, according to objects such as improvement of adhesion to the clinging layer, improvement of smoothness, and other objects.

The thickness of the base film is different according to various uses and is particularly not limited, but is generally in the range of 25 to 1000 $\mu$m, preferably 50 to 200 $\mu$m.

In the clinging sheet of the present invention, the siloxane-modified polyurethane resin used in the clinging layer is a polyurethane resin modified with a polysiloxane, and contains a polysiloxane component in the range of 2 to 50 percent by weight, preferably 2 to 30 percent by weight. When the polysiloxane component is less than 2 percent by weight, in the cases of the clinging sheet adhered on the adherend made of the polycarbonate resin, the acrylic resin or the vinyl chloride resin, the adhesive strength is too large as time passes and the clinging sheet can be not easily peeled from the adherend. Further, the adhesive remains on the adherend. On the other hand, when the polysiloxane component is more than 50 percent by weight, the adhesiveness is decreased sharply. In particular, when the adherend is made of glass, the decrease is remarkable. Thus, the polysiloxane component needs to be in the range of 2 to 50 percent by weight. in order to cling the clinging sheet on any one of the adherends made of the glass, the polycarbonate resin, the acrylic resin, the ABS resin or the vinyl chloride resin, and to peel easily the clinging sheet from the adherend after long time passes.

Preferable preparation method of the siloxane-modified polyurethane resin includes, for example, a preparation method comprising reacting a polysiloxane having an active hydrogen group, a high molecular weight polyol and a polyisocyanate. More preferable preparation method of the siloxane-modified polyurethane resin includes a preparation method comprising reacting a polysiloxane having an active hydrogen group, a high molecular weight polyol and a polyisocyanate to obtain an intermediate of a siloxane-modified polyurethane resin and then crosslinking the intermediate with a curing agent. The weight average molecular weight of the intermediate of the siloxane-modified polyurethane resin is generally 5,000 to 300,000.

The polysiloxane having an active hydrogen group has preferably the weight average molecular weight of 600 to 10,000, and has preferably one or more active hydrogen groups, more preferably two or more active hydrogen groups. Representative examples of the polysiloxane having an active hydrogen group are as follows.

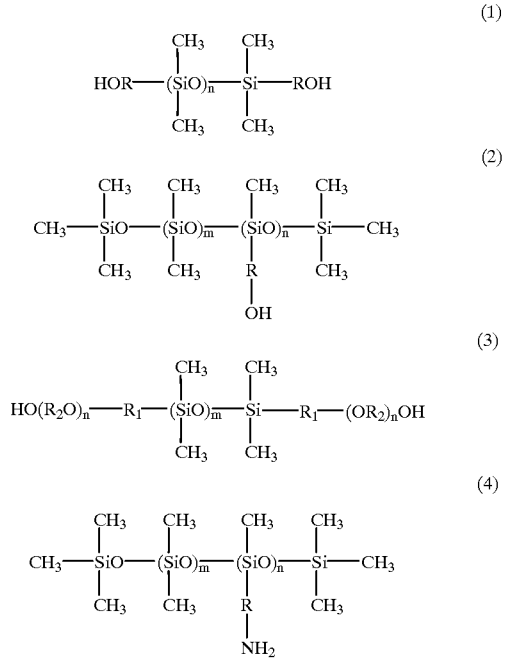

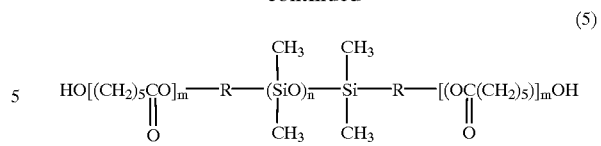

In the formulas (1) to (5), R is an alkylene group having 2 to 8 carbon atoms, $R_1$ and $R_2$ are each an alkylene group having 1 to 4 carbon atoms, and n and m are each an integer of 1 or more.

As the high molecular weight polyol, conventional high molecular weight polyols can be used. The weight average molecular weight of the high molecular weight polyol is preferably 600 to 10,000, more preferably 1,000 to 4,000. The high molecular weight polyol includes a polyester polyol, a polyether polyol, a polycarbonate polyol and a polylactone polyol, and is more preferably a polyester polyol and a polyether polyol.

The polyether polyol is preferably a mixture of (A) a polyether polyol comprising a linear alkylene group having 4 to 8 carbon atoms and (B) a polyether polyol comprising an alkylene group having 2 to 3 carbon atoms and/or a side chain-containing alkylene group, wherein the mixture ratio can be properly selected according to uses and is preferably in the range of 10/90 to 90/10.

The linear alkylene group having 4 to 8 carbon atoms in (A) includes a tetramethylene group, a pentamethylene group, a hexamethylene group, a heptamethylene group and a octamethylene group.

The polyether polyol comprising a linear alkylene group having 4 to 8 carbon atoms (A) is representatively a polytetramethylene glycol.

The alkylene group having 2 to 3 carbon atoms in (B) includes ethylene group and a propylene group. The side chain-containing alkylene group has preferably a main chain having 2 to 8 carbon atoms or a side chain having 1 to 4 carbon atoms.

The polyether polyol (B) is representatively a polyethylene glycol, a polypropylene glycol and a ethylene glycol-propylene glycol copolymer.

In the present invention, as the component of the polyurethane resin, a low molecular weight diol can be used as a chain extension agent together with the high molecular weight polyol. The low molecular weight diol includes ethylene glycol, a prolylene glycol, 1,4-butanediol, 1,3-butanediol, 1,6hexanediol, diethylene glycol, a cyclohexanediol, isophoronediamine, a linear aliphatic diamine and m-phenylenediamine.

The polyisocyanate includes conventional polyisocyanates. Representative examples of the polyisocyanate are, for example, 4,4'-diphenylmethane diisocyanate (MDI), hydrogenated MDI, tolylene diisocyanate (TDI), isophorone diisocyanate (IPDI), and the like.

For the preparation of the siloxane-modified polyurethane resin, the curing agent may be not used, but it is preferable to prepare the intermediate of the siloxane-modified polyurethane resin and then to mix the curing agent into the intermediate. Representative examples of the curing agent are, for example, a polyisocyanate, a polyisocyanate prepolymer prepared by reacting a polyhydric alcohol with a polyisocyanate, a polyisocyanate prepolymer prepared by reacting a polyol with a polyisocyanate, and a block compolymer thereof. When the curing agent is used, the amount of the curing agent is preferably 10 to 70 parts by weight against 100 parts by weight of the solid content of the intermediate of the siloxane-modified polyurethane resin.

The clinging layer in the present invention can contain one or more additives such as a colorant, a stabilizer, a pigment and a absorbent of ultraviolet rays, and the like.

The clinging layer in the present invention is formed on one or both surfaces of the base film. The clinging layer is single layer or multi layers. When the base film is difficult to be adhered strongly with the clinging layer, the clinging layer is preferably a multi layer comprising a siloxane-modified polyurethane resin layer and a polyurethane resin layer having good adhesiveness to the base film, in which the polyurethane resin layer having good adhesiveness is formed on the base film side. The thickness of the clinging layer is generally 5 or more $\mu$m, preferably 10 to 30 $\mu$m. When the thickness is less than 5 $\mu$m, the cling strength to the adherend may be insufficient. The surface of the clinging layer is preferably smooth.

The clinging sheet of the present invention is, for example, prepared by applying the siloxane-modified polyurethane resin on one or both surfaces of the base film being a base material by conventional methods such as blade coating, roll coating, gravure coating, bar coating, knife coating and extrusion melt coating and then by drying the application film to form the clinging layer, in general. The clinging layer can be cured by irradiating with irradiations such as ultraviolet ray and ionizing radiation, instead of heat drying or together with heat drying.

Further, in the clinging sheet of the present invention, a protect sheet can be covered on the clinging layer for protecting the clinging layer after formation of the clinging layer. The protect sheet includes, for example, conventional protect sheets having high smoothness for keeping smoothness of the clinging layer.

Preferable such protect sheets are, for example, a release treated coated paper having a mirror surface, a paper applied with a melt extruded polyolefin having a mirror surface or a release treated paper thereof, a high smooth synthetic resin films, such as a polyethylene terephthalate film, an oriented polypropylene film, or a release treated film thereof. The release treatment includes conventional release treatments. The release agent used in the release treatments includes, for example, a silicone resin, an alkyd resin, a silicone-alkyd copolymer resin, polyethylene, polypropylene or a mixture thereof, and a mixture of a silicone and a polyvinyl alcohol.

The clinging sheet can be rolled and the clinging layer without the protect sheet can be laminated on the opposite surface of the base film, so that the clinging sheet roll can be prepared. When the clinging layers are formed on both surfaces of the base film, a double formed clinging sheet or a roll thereof can be obtained.

Adherends, on which the clinging sheet of the present invention can adhere, have a smooth surface which is intended to be clung with the clinging sheet. Examples of the adherends are adherends such as a glass plate, a resin plate or a resin molding made of a polycarbonate resin, an acrylic resin, a polyvinyl chloride resin, an ABS resin or a polyolefin resin, a coated steel plate, or a tile.

The present invention will be described more specifically referring to embodiments. It should be noted that the present invention is not limited by these examples. The words, "part" or "percent" in the followings is based by weight.

Evaluation methods of the clinging sheet are carried out by the following methods.

(1) peeling property

Samples of the clinging sheet having 25 mm width were laid and pressed respectively on a glass plate, a polycarbonate resin plate and an acrylic resin plate, by traveling a roller having 2 Kg of weight on it back and forth once. The clinging sheets clung on the plates were stood respectively in the atmosphere of 23° C. and 65% of relative humidity and in the drying atmosphere of 60° C. for 24 hours. And then, the clinging sheets were peeled from the plates by hand.

The peeling property was evaluated by the following standard.

○: The clinging sheet was peeled.

Δ: The clinging sheet was peeled, but difficult to peel.

×: The clinging sheet was not peeled.

When stains such as a blur on the adherend after peeling were observed by visual, the evaluation was "×" even if the clinging sheet was peeled.

(2) clinging property

The clinging sheet having 25 mm width was laid and pressed on a glass plate by traveling a roller having 2 Kg of weight on it back and forth once in the atmosphere of 20° C. and 65% of relative humidity. And then the clinging sheet was immediately peeled from the glass plate by hand. The peel resistance was evaluated by the following standard.

○: The clinging sheet was clung on the glass plate.

×: The clinging sheet was peeled from the glass plate.

EXAMPLE 1

In 178 parts of methyl ethyl ketone (MEK), 7.3 parts of siloxane-containing polysiloxane having hydroxyl groups in both terminals which was a polysiloxane represented by formula (1) and having an average molecular weight of 5600, 100 parts of polybutylene adipate polyester polyol which had a weight average molecular weight of 2000 (hereinafter called the "PBA-2000") and 10 parts of 1,4-butanediol as a chain extension agent were dissolved. In the solution, 28.2 parts of tolylenediisocyanate (hereinafter called the "TDI") were added and the mixture was reacted at 80° C. for 8 hours to obtain a sticky solution which contained a solid content of 45 percent and had a viscosity of 800 dPa·s/25° C. The weight average molecular weight of the intermediate of the siloxane-modified polyurethane resin being the solid content of the sticky solution was about 100,000.

The mixture of 323 parts of the solution of the intermediate of the siloxane-modified polyurethane resin and 32.4 parts of aliphatic polyisocyanate (trade name: CORONATE HL, a production of NIPPON POLYURETHANE INDUSTRY CO., LTD.) as a curing agent was applied on a polyethylene terephthalate film (thickness: 50 $\mu$m) and dried to form the clinging layer which consisted of a crosslinked siloxane-modified polyurethane resin and had a dried thickness of 20 $\mu$m (Table 1). The properties of the obtained clinging sheet are shown in Table 3.

EXAMPLE 2

A clinging layer was formed on the polyethyleneterephthalate film by the same method as in Example 1, except that a polysiloxane represented by formula (2) and having an average molecular weight of 1,500 was used as the siloxane-containing polysiloxane, a polytetramethylene glycol having a weight average molecular weight of 2,000 (hereinafter called the "PTMG-2000") was used as the polyol, the each components were used in the amount shown in Table 1. The properties of the obtained clinging sheet are shown in Table 3.

EXAMPLE 3

A clinging layer was formed on the polyethyleneterephthalate film by the same method as in Example 1, except that a polysiloxane represented by formula (5) and having an average molecular weight of 6,600 was used as the siloxane-containing polysiloxane, PTMG-2000 and a polypropylene glycol having a weight average molecular weight of 2,000 (hereinafter called the "PPG-2000") were used as the polyol, the each components were used in the amount shown in Table 1. The properties of an obtained clinging sheet are shown in Table 3.

EXAMPLE 4

A clinging layer was formed on the polyethyleneterephthalate film by the same method as in Example 1, except that a polysiloxane represented by formula (3) and having an average molecular weight of 1,600 was used as the siloxane-containing polysiloxane, a polytetramethylene glycol having a weight average molecular weight of 1,000 (hereinafter called the "PTMG-1000") and PBA-2000 were used as the polyol, the each components were used in the amount shown in Table 1. The properties of an obtained clinging sheet are shown in Table 3.

EXAMPLE 5

A clinging layer was formed on the polyethyleneterephthalate film by the same method as in Example 1, except that a polysiloxane represented by formula (1) and having an average molecular weight of 3,200 was used as the siloxane-containing polysiloxane, PTMG-2000 was used as the polyol, the each components were used in the amount shown in Table 1. The properties of the obtained clinging sheet are shown in Table 3.

EXAMPLE 6

A clinging layer was formed on the polyethyleneterephthalate film by the same method as in Example 1, except that a polysiloxane represented by formula (1) and having an average molecular weight of 1,600 was used as the siloxane-containing polysiloxane, PTMG-2000 and a polyethylene glycol having a weight average molecular weight of 2,000 (hereinafter called the "PEG-2000") was used as the polyol, 1,3-butanediol (hereinafter called the "1,3-BD") was used as the chain extension agent, isophorone diisocyanate (hereinafter called the "IPDI") was used as the diisocyanate, CORONATE HL was used as the curing agent, and the each components were used in the amount shown in Table 2. The properties of an obtained clinging sheet are shown in Table 4.

EXAMPLE 7

A clinging layer was formed on the polyethyleneterephthalate film by the same method as in Example 1, except that a polysiloxane represented by formula (1) and having an average molecular weight of 3,200 was used as the siloxane-containing polysiloxane, PTMG-1000, a polypropylene glycol having a weight average molecular weight of 1,000 (hereinafter called the "PPG-1000") and a polybutylene adipate polyester polyol having an average molecular weight of 1,000 (hereinafter called the "PBA-1000") were used as the polyol, ethylene glycol was used as the chain extension agent, IPDI was used as the diisocyanate, CORONATE HL was used as the curing agent, and the each components were used in the amount shown in Table 2. The properties of an obtained clinging sheet are shown in Table 4.

EXAMPLE 8

A clinging layer was formed on the polyethyleneterephthalate film by the same method as in Example 1, except that a polysiloxane represented by formula (4) and having an average molecular weight of 4,500 was used as the siloxane-containing polysiloxane, PPG-1000 and PBA-2000 were used as the polyol, 4,4'-diphenylmethane diisocyanate (hereinafter called the "MDI") was used as the diisocyanate, and the each components were used in the amount shown in Table 2. The properties of an obtained clinging sheet are shown in Table 4.

EXAMPLE 9

A clinging layer was formed on the polyethyleneterephthalate film by the same method as in Example 1, except that a polysiloxane represented by formula (1) and having an average molecular weight of 3,200 was used as the siloxane-containing polysiloxane, PPG-1000, PEG-2000 and PTMG-1000 were used as the polyol, MDI was used as the diisocyanate, and the each components were used in the amount shown in Table 2. The properties of an obtained clinging sheet are shown in Table 4.

EXAMPLE 10

In 218 parts of methyl ethyl ketone (MEK), 28.0 parts of siloxane-containing polysiloxane having hydroxyl groups in both terminals which was a polysiloxane represented by formula (3) and having an average molecular weight of 1600, and 50 parts of PTMG-1000, 50 parts of PPG-1000 and 5 parts of 1,3-butanediol as the polyol were dissolved. In the solution, 45.2 parts of hydrogenated MDI (hereinafter called the "HMDI") were added and the mixture was reacted at 100° C. for 10 hours to obtain a sticky solution which contained a solid content of 45 percent and had a viscosity of 900 dPa·s/25° C. The weight average molecular weight of the intermediate of the siloxane-modified polyurethane resin being the solid content of the sticky solution was about 100,000.

The mixture of 396 parts of the solution of the intermediate of the siloxane-modified polyurethane resin and 59.4 parts of CORONATE HL as a curing agent were applied on a polyethyleneterephthalate film (thickness: 50 μm) and dried to form the clinging layer which consisted of a crosslinked siloxane-modified polyurethane resin and had a dried thickness of 20 μm (Table 2). The properties of the obtained clinging sheet are shown in Table 4.

COMPARATIVE EXAMPLE 1

A clinging layer was formed on the polyethyleneterephthalate film by the same method as in Example 3, except that the polysiloxane was not used (Table 5). The properties of an obtained clinging sheet are shown in Table 6.

COMPARATIVE EXAMPLE 2

A clinging layer was formed on the polyethyleneterephthalate film by the same method as in Example 3, except that a polysiloxane represented by formula (1) and having an average molecular weight of 1,800 was used as the siloxane-containing polysiloxane, and the each components were used in the amount shown in Table 5. The properties of an obtained clinging sheet are shown in Table 6.

TABLE 1

| Example | 1 | 2 | 3 | 4 | 5 |
|---|---|---|---|---|---|
| siloxane-modified polyurethane resin composition (weight part) | | | | | |
| intermediate of siloxane-modified polyurethane resin | | | | | |
| polysiloxane | | | | | |
| formula / molecular weight | | | | | |
| (1) 5600 | 7.3 | — | — | — | — |
| (1) 3200 | — | — | — | — | 7 |
| (1) 1600 | — | — | — | — | — |
| (2) 1500 | — | 4.0 | — | — | — |
| (3) 1600 | — | — | — | 17 | — |
| (5) 6600 | — | — | 95 | — | — |
| (4) 4500 | — | — | — | — | — |
| polyol | | | | | |
| PBA-2000 | 100 | — | — | 33 | — |
| PBA-1000 | — | — | — | — | — |
| PTMG-2000 | — | 100 | 50 | — | 100 |
| PTMG-1000 | — | — | — | 67 | — |
| PPG-2000 | — | — | 50 | — | — |
| PPG-1000 | — | — | — | — | — |
| PEG-2000 | — | — | — | — | — |
| chain extension agent | | | | | |
| 1,4-BD | 10 | 9 | 10 | 10 | 10 |
| 1,3-BD | — | — | — | — | — |
| EG | — | — | — | — | — |
| diisocyanate | | | | | |
| TDI | 28.2 | 28.0 | 40.3 | 35.7 | 28.4 |
| IPDI | — | — | — | — | — |
| MDI | — | — | — | — | — |
| HMDI | — | — | — | — | — |
| curing agent | | | | | |
| CORONATE HL | 32.4 | 31 | 109 | 54 | 32 |
| polysiloxane content (wt %) | 4.3 | 2.4 | 29.0 | 8.4 | 4.1 |

TABLE 2

| Example | 6 | 7 | 8 | 9 | 10 |
|---|---|---|---|---|---|
| siloxane-modified polyurethane resin composition (weight part) | | | | | |
| intermediate of siloxane-modified polyurethane resin | | | | | |
| polysiloxane | | | | | |
| formula / molecular weight | | | | | |
| (1) 5600 | — | — | — | — | — |
| (1) 3200 | — | 16 | — | 37 | — |
| (1) 1600 | 35 | — | — | — | — |
| (2) 1500 | — | — | — | — | — |
| (3) 1600 | — | — | — | — | 28 |
| (5) 6600 | — | — | — | — | — |
| (4) 4500 | — | — | 62 | — | — |
| polyol | | | | | |
| PBA-2000 | — | — | 25 | — | — |
| PBA-1000 | — | 10 | — | — | — |
| PTMG-2000 | 75 | — | — | — | — |
| PTMG-1000 | — | 60 | — | 34 | 50 |
| PPG-2000 | — | — | — | — | — |
| PPG-1000 | — | 30 | 75 | 33 | 50 |
| PEG-2000 | 25 | — | — | 33 | — |
| chain extension agent | | | | | |
| 1,4-BD | — | — | 5 | 5 | — |
| 1,3-BD | 5 | — | — | — | 5 |
| EG | — | 1.4 | — | — | — |
| diisocyanate | | | | | |
| TDI | — | — | — | — | — |
| IPDI | 28.2 | 28.2 | — | — | — |
| MDI | — | — | 29.6 | 37.6 | — |
| HMDI | — | — | — | — | 45.2 |
| curing agent | | | | | |
| CORONATE HL | 93.3 | 97 | 43.7 | 36.2 | 59.4 |
| polysiloxane content (wt %) | 14.7 | 7.3 | 27.0 | 21.9 | 12.5 |

In Table 1 and Table 2, abbrebiations mean the followings.

PTMG-2000: polytetramethylene glycol, weight average molecular weight 2000

PTMG-1000: polytetramethylene glycol, weight average molecular weight 1000

PPG-2000: polypropylene glycol, weight average molecular weight 2000

PPG-1000: polypropylene glycol, weight average molecular weight 1000

PEG-2000: polyether glycol, weight average molecular weight 2000

PBA-2000: polybutylene adipate, weight average molecular weight 2000

PBA-1000: polybutylene adipate, weight average molecular weight 1000

CORONATE HL: a production of NIPPON POLYURETHANE INDUSTRY CO., LTD., aliphatic polyisocyanat 1,4-BD: 1,4-butanediol 1,3-BD: 1,3-butanediol EG: ethylene glycol MDI: 4,4'-diphenylmethane diisocyanate TDI: tolylene diisocyanate IPDI: isophorone diisocyanate HMDI: hydrogenated MDI

TABLE 3

| | | Example | | | | |
|---|---|---|---|---|---|---|
| | | 1 | 2 | 3 | 4 | 5 |
| peeling property after 24 hours | | | | | | |
| glass plate | 23° C., 65% RH | ○ | ○ | ○ | ○ | ○ |
| | 60° C. | ○ | ○ | ○ | ○ | Δ |
| polycarbonate plate | 23° C., 65% RH | Δ | Δ | ○ | ○ | ○ |
| | 60° C. | Δ | Δ | ○ | Δ | Δ |
| acrylic plate | 23° C., 65% RH | Δ | Δ | ○ | ○ | ○ |
| | 60° C. | Δ | Δ | ○ | Δ | Δ |
| clinging property | | | | | | |
| glass plate | | ○ | ○ | Δ | ○ | Δ |

TABLE 4

|  |  | Example | | | | |
|---|---|---|---|---|---|---|
|  |  | 6 | 7 | 8 | 9 | 10 |
| peeling property after 24 hours | | | | | | |
| glass plate | 23° C., 65% RH | ○ | ○ | ○ | ○ | ○ |
|  | 60° C. | ○ | ○ | Δ | ○ | ○ |
| polycarbonate plate | 23° C., 65% RH | ○ | ○ | ○ | ○ | ○ |
|  | 60° C. | ○ | ○ | Δ | ○ | ○ |
| acrylic plate | 23° C., 65% RH | ○ | ○ | ○ | ○ | ○ |
|  | 60° C. | ○ | ○ | Δ | ○ | ○ |
| clinging property | | | | | | |
| glass plate | | ○ | ○ | ○ | ○ | ○ |

TABLE 5

|  |  | Comparative Example | |
|---|---|---|---|
|  |  | 1 | 2 |
| siloxane-modified polyurethane resin composition (weight part) intermediate of siloxane-modified polyurethane resin polysiloxane | | | |
| formula (1) | molecular weight 1800 | — | 245 |
| polyol | | | |
| PBA - 2000 | | — | — |
| PBA - 1000 | | — | — |
| PTMG - 2000 | | 50 | 50 |
| PTMG - 1000 | | — | — |
| PPG - 2000 | | 50 | 50 |
| PPG - 1000 | | — | — |
| PEG - 2000 | | — | — |
| chain extension agent | | | |
| 1,4 - BD | | 10 | 10 |
| 1,3 - BD | | — | — |
| EG | | — | — |
| diisocyanate | | | |
| TDI | | 28 | 51.6 |
| IPDI | | — | — |
| MDI | | — | — |
| HMD | | — | — |
| curing agent | | | |
| CORONATE HL | | 46 | 46 |
| polysiloxane content (wt %) | | 0 | 55.5 |

TABLE 6

|  |  | Comparative Example | |
|---|---|---|---|
|  |  | 1 | 2 |
| peeling property after 24 hours | | | |
| glass plate | 23° C., 65% RH | ○ | ○ |
|  | 60° C. | x | ○ |
| polycarbonate plate | 23° C., 65% RH | Δ | Δ |
|  | 60° C. | x | ○ |
| acrylic plate | 23° C., 65% RH | Δ | ○ |
|  | 60° C. | x | ○ |
| clinging property | | | |
| glass plate | | ○ | x |

The entire disclosure of Japanese Patent Application No. Hei 9-268243, filed on Sep. 16, 1997, including the specification, claims and summary is incorporated herein by reference in its entirety.

The invention has been described in detail with particular reference to preferred embodiments thereof, but it is understood that variations and modifications can be effected within the spirit and scope of the invention.

What is claimed is:

1. A clinging sheet which comprises a base film and a clinging layer formed on one or both surfaces of the base film, said clinging layer comprising a siloxane-modified polyurethane resin containing 2 to 50 percent by weight of a polysiloxane component, wherein the polyurethane resin is prepared by reacting an active hydrogen group-containing polysiloxane, a polymeric polyol and a polyisocyanate, and the polymeric polyol is a polyester polyol or a polyether polyol.

2. The clinging sheet as claimed in claim 1, wherein at least 50 percent by weight of the polymeric polyol is a polyether polyol.

3. The clinging sheet as claimed in claim 2, wherein the polyether polyol is a mixture of (A) a polyether polyol comprising a linear chain alkylene group having 4 to 8 carbon atoms and (B) a polyether polyol comprising an alkylene group having 2 to 3 carbon atoms and/or a side chain-containing alkylene group.

\* \* \* \* \*